United States Patent
Hollins

[11] 3,963,090
[45] June 15, 1976

[54] AUTOMATIC SEAT BELT BUCKLE UNLATCHING MECHANISM

[76] Inventor: Jesse R. Hollins, 40 Stoner Ave., Great Neck, N.Y. 11021

[22] Filed: Jan. 9, 1975

[21] Appl. No.: 539,704

[52] U.S. Cl. .......................... 180/82 C; 24/230 A; 280/744
[51] Int. Cl.² ........................................ B60R 21/10
[58] Field of Search ............ 180/82 C; 280/150 SB; 24/230 A, 265

[56] References Cited
UNITED STATES PATENTS

| | | | |
|---|---|---|---|
| 3,146,846 | 9/1964 | Gutshall | 180/82 C |
| 3,168,158 | 2/1965 | Schoeffler | 180/82 C |
| 3,177,966 | 4/1965 | Schoeffler | 180/82 C |
| 3,189,967 | 6/1965 | Walker | 24/265 |
| 3,194,582 | 7/1965 | Kutz | 180/82 C |
| 3,215,220 | 11/1965 | Schoeffler | 180/82 C |

Primary Examiner—M. H. Wood, Jr.
Assistant Examiner—Terrance L. Siemens
Attorney, Agent, or Firm—Kirschstein, Kirschstein, Ottinger & Frank

[57] ABSTRACT

A seat belt buckle automatic unlatching mechanism including a seat belt arrangement comprised of a first seat belt strap and a second seat belt strap. Attached to one end of the first seat belt strap is a latching tongue and attached to one end of the second seat belt strap is a tongue latching mechanism. The tongue latching mechanism automatically releases the latching tongue when the motor vehicle engine has stalled, as due to an accident.

2 Claims, 6 Drawing Figures

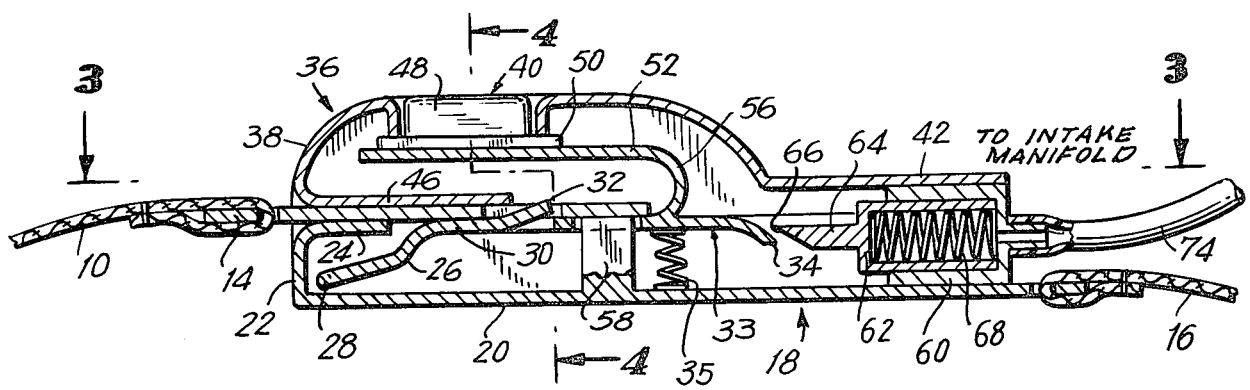
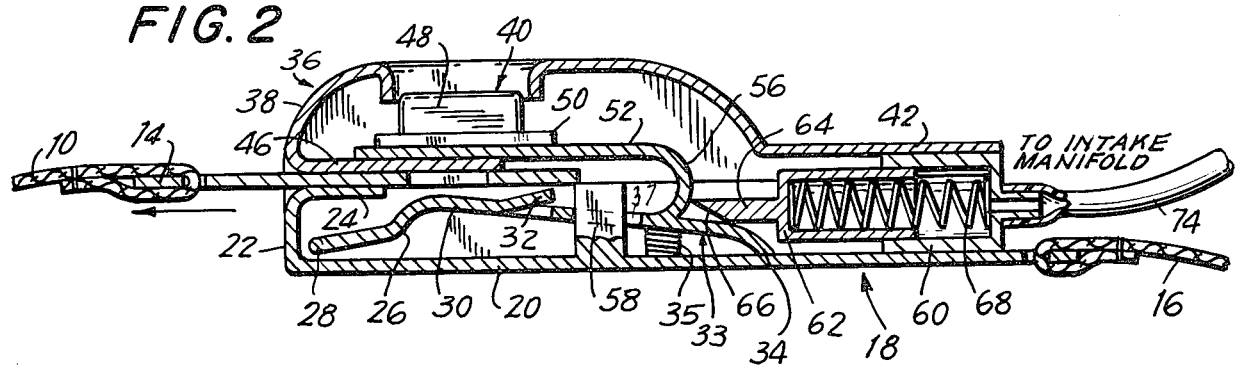
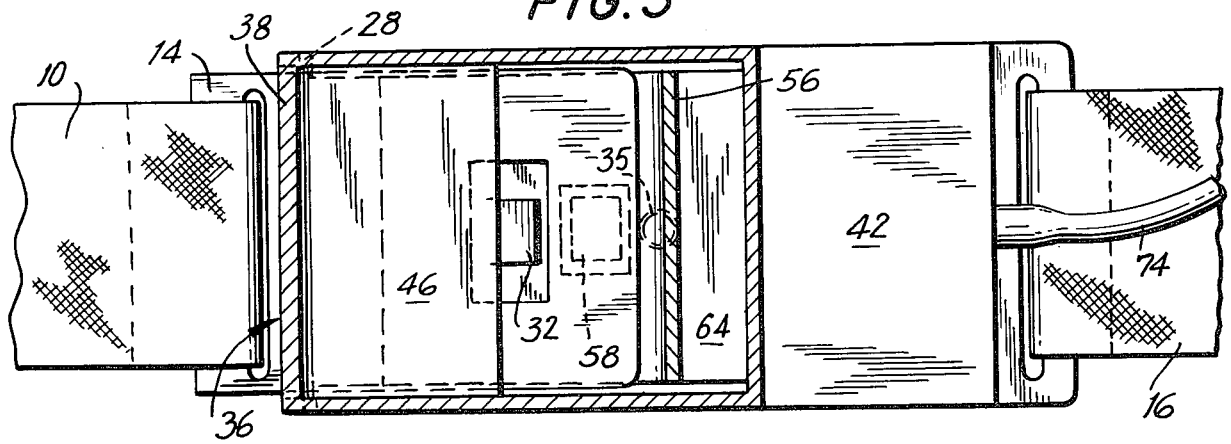
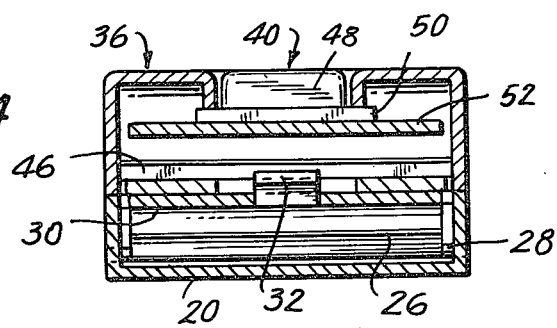

AUTOMATIC SEAT BELT BUCKLE UNLATCHING MECHANISM

BACKGROUND OF THE INVENTION

1. Field of the Invention

Apparatus for automatically unlatching a seat belt buckle latching tongue from a seat belt buckle tongue latching mechanism.

2. Description of the Prior Art

In accordance with federal safety regulations, every motor vehicle manufacturer in the United States now includes seat belt units. Usually each seat belt unit includes two seat belts. Attached to the end of one seat belt is a latching tongue. Attached to the end of the other seat belt is a tongue latching mechanism which includes a latch that the latching tongue can be locked onto.

A common fear that many persons have with using seat belts is that if they are involved in an accident they will not be able to release the seat belt latching tongue from the seat belt tongue latching mechanism so as to remove himself, or be removed by other persons, from the motor vehicle. As an example, if a person wearing a seat belt is injured and the push button release for his seat belt buckle tongue latching mechanism is facing towards his body (if the seat belt becomes twisted), it is difficult for a rescuer to gain access to the seat belt buckle push button to release the latching tongue from the tongue latching mechanism so the person can be removed from the motor vehicle. It is not feasible for a rescuer to sever the seat belt straps unless a knife or cutting instrument is available.

SUMMARY OF THE INVENTION

1. Purposes of the Invention

It is an object of the present invention to provide a seat belt automatic release apparatus.

Still another object of the present invention is to provide a seat belt buckle automatic unlatching apparatus whereby if the motor vehicle engine should stall, as by reason of being involved in a collision or accident, the seat belt buckle latch automatically releases the seat belt buckle latching tongue.

Still a further object of the present invention is to provide a seat belt buckle apparatus wherein the latch member automatically releases the latching tongue when the ignition condition is changed from an ignition "on" condition to an ignition "off" condition.

Still a further object of the present invention is to provide apparatus capable of achieving each of the above objects which is reliable in operation.

Other objects of the present invention, in part, will be obvious and, in part, will be pointed out hereinafter.

2. Brief Description of the Invention

According to one embodiment of the present invention, the foregoing as well as other objects are accomplished by securing to one end of a seat belt strap a latching tongue. To a free end of the paired seat belt strap is a tongue latching apparatus. The latching apparatus includes a rigid strip which is pivotally connected to a plate, said plate in turn being secured to the paired seat belt strap. Formed on said rigid strip is a latch.

A spring biases said rigid strip to a position such that when said latching tongue is inserted in said latching apparatus said latch is received in said latching tongue. When the bias of the spring is overcome the rigid strip is accordingly depressed so that the latch no longer locks the latching tongue.

Means is provided whereby the push button of the seat belt buckle apparatus upon being manually depressed overcomes the bias of the spring depressing the rigid strip thereby removing the latch from the seat belt latching tongue.

A rigid strip actuating means is provided and has a first position and a second position. In the first position of the rigid strip actuating means said means is spaced from said rigid strip. In the second position the rigid strip actuating means abuts the rigid strip causing the same to be depressed whereby the latch is no longer received in the latching tongue.

The rigid strip actuating means is movable with a piston and the position of the piston is controlled by the vacuum from the engine intake manifold, i.e. when the engine intake manifold is operative, as during normal operating conditions, the piston is in the first position and the rigid strip actuating means is in the first position. However, if the engine intake manifold is inoperative, as might occur during a motor vehicle collision or accident causing the engine to stall, the piston is in the second position whereby the rigid strip actuating means is in the second position and causes the rigid strip to be depressed so that the latch is no longer received in the latching tongue. Thus, the seat belt latching tongue is automatically unlatched.

The invention accordingly consists in the features of construction, combination of elements, and arrangement of parts which will be exemplified in the apparatus hereinafter described and of which the scope of application will be indicated in the appended claims.

BRIEF DESCRIPTION OF THE DRAWINGS

In the drawings wherein like parts are identified by the same reference numeral:

FIG. 1 is a cross sectional view of a first embodiment of the present invention wherein the seat belt strap with tongue is secured by the seat belt tongue latch;

FIG. 2 is a cross sectional view of the structure shown in FIG. 1 wherein the seat belt tongue latch is moved to a position such that it does not latch the tongue;

FIG. 3 is a sectional view taken substantially along the line 3—3 of FIG. 1;

FIG. 4 is a sectional view taken substantially along the line 4—4 of FIG. 3;

DESCRIPTION OF THE PREFERRED EMBODIMENTS

Figure 5:
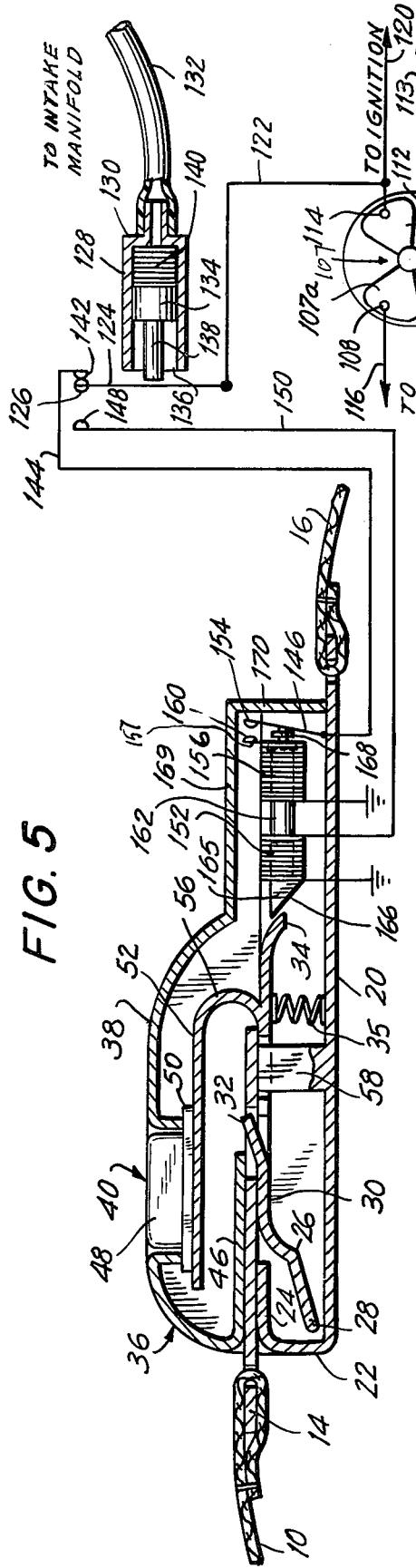
FIG. 5 is a combined sectional and schematic view of an alternate embodiment of the present invention wherein the latch is received in the tongue member.

In the drawings a seat belt strap 10 is illustrated. Seat belt strap 10 has two ends with one of said ends (not shown in the drawings) being secured to a motor vehicle chassis. Secured to the remaining end of seat belt strap 10 by conventional means is a latching tongue 14. A further seat belt strap 16 is provided which together with seat belt strap 10 and the associated structure forms a seat belt assembly for a person in a motor vehicle. Seat belt strap 16 includes two ends (with one end not shown in the drawings secured to the motor vehicle chassis). Secured to seat belt strap 16 is seat belt tongue latching mechanism 18.

More specifically, seat belt latching mechanism 18 includes a flat plate 20 which is secured to the end of seat belt strap 16 shown in the drawings. Located at the forward end (the end furthest from seat belt strap 16) of plate 20 is a vertical section 22. Vertical section 22 is of the same width as plate 20 while being perpendicular thereto. Extending from the upper portion of vertical section 22 toward the portion of plate 20 secured to seat belt strap 16 while being parallel to plate 20 is a guide lip 24.

A rigid metallic latch strip 26 includes a forward end 28 which is pivotally connected to plate 20 such that strip 26 can pivot relative to said plate. The pivot connection is by conventional means. Strip 26 includes an upper substantially flat section 30 which for the orientation shown in FIG. 2 is substantially parallel to plate 20. Projecting upwardly from section 30 is a latch 32. Latch 32 can be formed by an extrusion process or for that matter by any well known technique. Flat section 30 includes a rear section 33 and a slightly depending downwardly curved tail 34 which serves a function that will hereinafter be described. A spring 35 rests on plate 20 and urges flat section 30 to the position shown in FIG. 1.

A push button housing 36 is provided and includes a frame 38 which includes a well 40. The rear of frame 38 includes a cylinder securing section 42 which is parallel to plate 20 at all times. Extending inwardly from the forward position of frame 38 is a guide 46 which is spaced from and parallel to lip 24. Located in central opening 40 is a button 48 and said button rests on a button plate 50. Button plate 50 is affixed to button support 52. A curved section 56 extends from button support 52 to rear section 33. The means of securing curved section 56 to rear section 33 can be by welding or by any other securing means.

A bumper 58 is provided which extends through an opening 37 in latch strip 26. The top of bumper 58 prevents the tip of latching tongue 14 from dipping downwardly.

Affixed to the portion of plate 20 adjacent the end of seat belt strap 16 shown in FIG. 1 and to cylinder securing section 42 is a cylinder 60. Located in cylinder 60 is a piston 62 which is adapted to slideably move within cylinder 60. Piston 62 is cylindrically shaped and includes a closed end and projecting outwardly therefrom is a shaft 64. The free end of shaft 64 includes a cam surface 66 for a reason that will soon be readily apparent.

A compression spring 68 is located within cylinder 60 and biases piston 62 in a leftward direction. Absent an external force acting on piston 62 spring 68 causes piston 62 to be in a position such that cam surface 66 abuts tail 34 causing depression of said tail and latch strip 26 (FIG. 2). A conduit 74 connects the right end of cylinder 60 to the engine intake manifold.

When the motor vehicle engine is not running there will be no vacuum created by the engine intake manifold. Consequently, spring 66 will move piston 62 to its left position (FIG. 2) so that cam surface 66 will depress tail 34 and strip 26 overcoming the bias of spring 35. As a result, latch 32 will be depressed and it will be impossible to latch seat belt latching tongue 16. When a person decides to drive the motor vehicle the engine will be started. The vacuum created by the engine intake manifold will overcome the bias of spring 66 maintaining piston 62 in the position shown in FIG. 1. Spring 35 will maintain latch 32 in the position shown in FIG. 1. Seat belt latching tongue 14 is inserted between guide lip 24 and guide 46 and slightly instantaneously depresses latch 32 against the bias of spring 35 until the latch is received within the opening in latching tongue 14. Strip 30 slides downwardly along bumper 58 when the latch is momentarily depressed.

If the motor vehicle engine should stall, as occurs due to an accident, there will no longer be a vacuum created by the intake manifold. Consequently, spring 66 will expand moving piston 62 to the position shown in FIG. 2 with cam surface 66 depressing tail 34. Latch strip 26 will be depressed overcoming the bias of spring 35. As a result, latch 32 will no longer be received in latching tongue 14 thus the latching tongue 14 will be free of the latching mechanism, thereby freeing the seat belt and the occupant.

If it is desired to release the latching tongue from the latching mechanism while the motor vehicle engine is operating, push button 48 is manually depressed thus depressing latch strip 26 against the bias of spring 35 so that the latch 32 is no longer received in the opening in the latching tongue and said latching tongue can be removed from the latching mechanism.

It is thus apparent that if an accident should occur causing the motor vehicle engine to stall that the problem of freeing an occupant from the fastened seat belt is eliminated.

Figure 6:
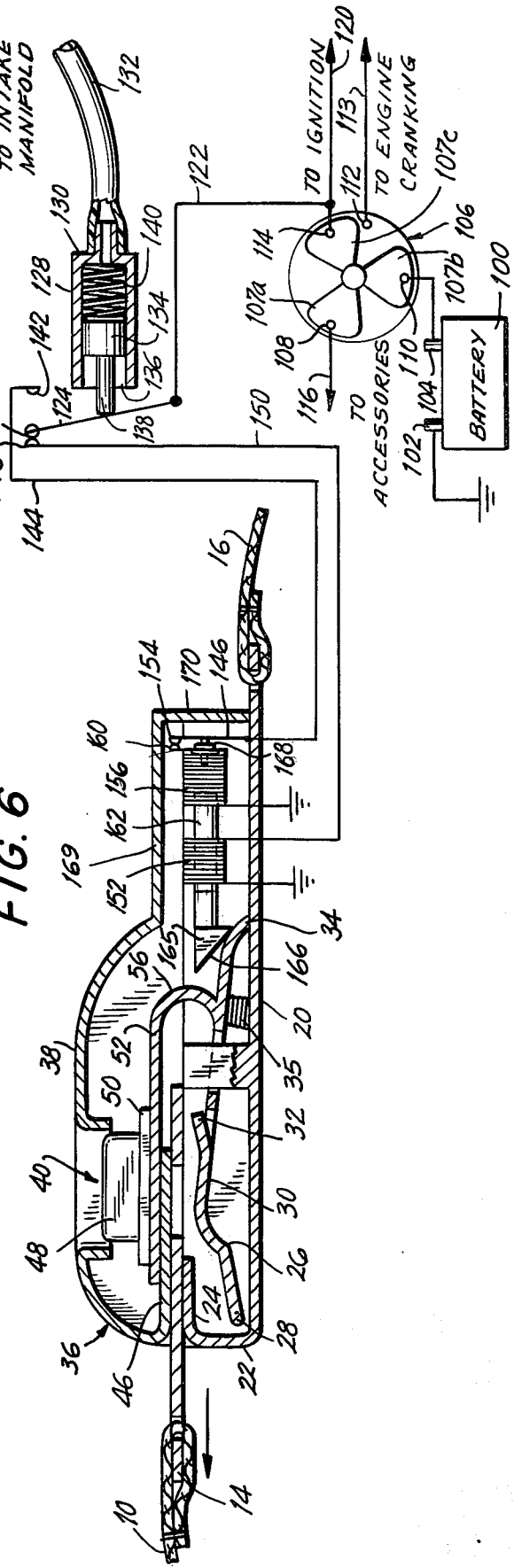
FIG. 6 is a sectional view of the structure shown in FIG. 5 wherein the latch does not lock the tongue member.

In FIGS. 5 and 6 of the drawings, an alternate embodiment of the present invention is shown and like parts in both FIGS. are identified by the same reference numeral. A motor vehicle battery 100 is shown and includes posts 102 and 104. Battery post 102 is connected to ground whereas battery post 104 is connected to ignition switch 106. Ignition switch 106 includes an accessories terminal 108, a battery terminal 110, an ignition cranking terminal 112 and an ignition terminal 114.

Ignition switch contact lever 107 includes segments 107a, 107b, and 107c. During normal engine operating condition which is shown in FIG. 5, segment 107b contacts terminal 110, segment 107a contacts terminal 108 and segment 107c contacts terminal 114. During engine cranking segment 107b contacts terminal 110, segment 107a is isolated from terminal 108 and segment 107c contacts terminals 112 and 114. When the motor vehicle is off, segment 107b does not contact terminal 110 so that the battery is isolated from the accessories, ignition and engine cranking system.

A wire 116 connects accessories terminal 108 to the motor vehicle accessories. A wire 113 connects ignition cranking terminal 112 to the cranking motor solenoid whereas a wire 120 connects terminal 114 to the ignition.

A further wire 122 is connected to wire 120 and to a metallic switch blade 124. Affixed to the end of metallic switch blade 124 is a dual contact 126. A cylinder 128 is provided in close proximity to metallic switch blade 124. A port is located in right end 130 of cylinder 128 and connected to said port is a tube 132 which is in fluid communication with the engine intake manifold.

Located within cylinder 128 is a piston 134 and secured thereto and extending through the right end 136 of cylinder 128 is a rod 138. A compression spring 140 is located within cylinder 128 and has its opposed ends abutting piston 134 and the right end of cylinder 128.

A contact 142 is provided and cooperates with contact 128. Contact 142 is connected by a wire 144 to a metallic blade conductor 146. A contact 148 also cooperates with contact 126 and is connected by a wire 150 to a solenoid 152. Solenoid 152 is connected to circuit ground.

Metallic blade conductor 146 has at the end thereof a terminal 154.

A further solenoid 156 is provided and electrically affixed to one end thereof is a metallic blade conductor 157. Located at the free end of metallic blade conductor 157 is a contact 160. The remaining end of solenoid 156 is grounded. A core 162 is provided and is within solenoids 152 and 156.

A cam member and shaft 165 is affixed to core 162 and includes a cam surface 166 which is similar to cam surface 66. Movable with core 162 is a blade actuator pin 168. Blade actuator pin 168 is electrically insulated from solenoid 156. Blade 157 is in the position shown in FIG. 6 when the engine is stalled or shut off (contacts 160 and 154 in circuit with each other) absent pin 168 moving the blade to the position shown in FIG. 5.

It is to be appreciated that blade 124 is biased to the position seen in FIG. 5, i.e. so that contact 126 is in circuit with contact 142 absent an external force acting on blade 126.

In the structure shown in FIGS. 5 and 6 frame 38 extends to a rear section 169 which is parallel to plate 20. Extending downwardly from the rear of rear section 169 and contacting plate 20 is a vertical wall 170.

Normally the motor vehicle engine will be inoperative and core 162 in the position shown in FIG. 6. Piston 134 will be in the position shown in FIG. 6 since there will be no vacuum from the intake manifold. When core 162 is in the position shown in FIG. 6, contacts 154 and 160 are in circuit with each other.

When the ignition is turned on, electrical current will flow through the ignition switch, wire 122, contacts 126 and 148, wire 150 to solenoid 152. This causes core 162 to be maintained in the position shown in FIG. 6 so that cam surface 166 acts on tail 134 preventing latching of the seat belt latching tongue.

Upon starting of the engine a vacuum is created in the intake manifold moving piston 134 to the position shown in FIG. 5 so that contacts 126 and 142 are now in circuit with each other. Since contacts 154 and 160 are in circuit with each other, solenoid 156 is energized causing core 162 to move to the position shown in FIG. 5. Upon completion of the movement of core 162 to the position shown in FIG. 5 actuator pin 168 acts against conductor 157 causing contact 154 to be spaced apart from contact 160 so that solenoid 158 is no longer energized. With core 162 in the position shown in FIG. 5, cam surface 166 no longer acts on tail 34 to prevent latching of the seat belt latching tongue.

If the motor should suddenly stall, as due to an accident, the loss of engine vacuum causes piston 134 to move to the position shown in FIG. 6 so that solenoid 152 is energized. Consequently, core 162 moves to the position shown in FIG. 6 and the seat belt latching tongue is no longer latched.

If the motor vehicle operator desires to release the tongue, he can do so by pressing button 48.

If the ignition is on with the engine inoperative, there is an automatic release of the tongue member since piston 134 will be in the position shown in FIG. 6 and cam surface 166 will depress tail 34.

If desired, a delay mechanism can be added to the system so that the automatic unlatching can be temporarily delayed.

It thus will be seen that there is provided an automatic seat belt buckle unlatching mechanism which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. An automatic seat belt buckle unlatching apparatus for a motor vehicle having an engine and a chassis, said apparatus comprising a first seat belt strap and a second seat belt strap, said first seat belt strap including a first end and a second end, said first end of said first seat belt strap adapted to be secured to said chassis, a tongue member secured to said second end of said first seat belt strap, said second seat belt strap including a first end and a second end with said first end adapted to be secured to said chassis, a seat belt latching mechanism secured to said second end of said second seat belt strap adapted to receive said tongue member, said latching mechanism including a plate secured to said second seat belt and a rigid latch strip having a latch adapted to engage said tongue member and a forward end pivotably connected to said plate, means biasing said latch strip into a position in which said latch may engage said tongue member when said tongue member is inserted into said latching mechanism, means selectively engaging said latch strip responsive to the operation of said engine, said means operatively engaging said latch strip when said engine is not operating to displace said latch strip from said position in which said latch may engage said tongue member to permit said tongue member to be removed from said latching mechanism, said means being disengaged from said latch strip when said engine is operating to permit said latch strip to be biased into said position in which said latch may engage said tongue member when it is inserted into said latching mechanism to permit said first seat belt strap and said second seat belt strap to be locked together and means independent of said selectively engaging means for manually releasing said tongue member while said motor vehicle engine is operating.

2. An automatic seat belt buckle unlatching apparatus according to claim 1 wherein said selectively engaging means includes a cam surface adapted to engage said latch strip, a cylinder, means for connecting said cylinder to an intake manifold of said engine, a piston movable in said cylinder, said cam surface movable with said piston, said piston having a first position wherein said cam surface engages said latch strip to displace said latch strip from said position in which said latch may engage said tongue member, and a second position wherein said cam surface is disengaged from said latch strip so that said latch strip may be urged into a position wherein said latch may engage said tongue member, and means biasing said piston to its first position, said biasing means being overcome, upon said engine intake manifold supplying a vacuum to said cylinder.

* * * * *